United States Patent
Mitchell et al.

(10) Patent No.: US 7,668,727 B2
(45) Date of Patent: Feb. 23, 2010

(54) SYSTEM AND METHOD FOR BUILDING LOADS FROM REQUISITIONS

(75) Inventors: Patrick J. Mitchell, Neenah, WI (US); Dean J. Sandvig, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 574 days.

(21) Appl. No.: 11/119,296

(22) Filed: Apr. 29, 2005

(65) Prior Publication Data

US 2006/0287926 A1 Dec. 21, 2006

(51) Int. Cl.
*G06Q 10/00* (2006.01)
*G06F 17/60* (2006.01)

(52) U.S. Cl. .................. 705/1; 705/7; 705/8; 705/9; 705/28

(58) Field of Classification Search .................. 705/22, 705/26–28, 1, 7–9; 700/99
See application file for complete search history.

(56) References Cited

U.S. PATENT DOCUMENTS

| | | |
|---|---|---|
| 6,937,992 B1 * | 8/2005 | Benda et al. .................. 705/7 |
| 2002/0072986 A1 * | 6/2002 | Aram ........................ 705/26 |
| 2002/0174038 A1 * | 11/2002 | Chien ........................ 705/28 |
| 2003/0172007 A1 * | 9/2003 | Helmolt et al. ............... 705/28 |
| 2004/0128205 A1 * | 7/2004 | Lanham et al. ............... 705/26 |
| 2005/0267791 A1 * | 12/2005 | LaVoie et al. ................. 705/7 |

* cited by examiner

*Primary Examiner*—Jeffrey A. Smith
*Assistant Examiner*—Adam Levine
(74) *Attorney, Agent, or Firm*—Armstrong Teasdale LLP

(57) ABSTRACT

A system and method of optimizing loads to be delivered on a particular date to a particular destination in response to a plurality of requisitions for various items to be delivered from various vendors to various destinations. Requisitions are arranged chronologically and line items are moved forward for early delivery to build optimized truck/container loads.

16 Claims, 7 Drawing Sheets

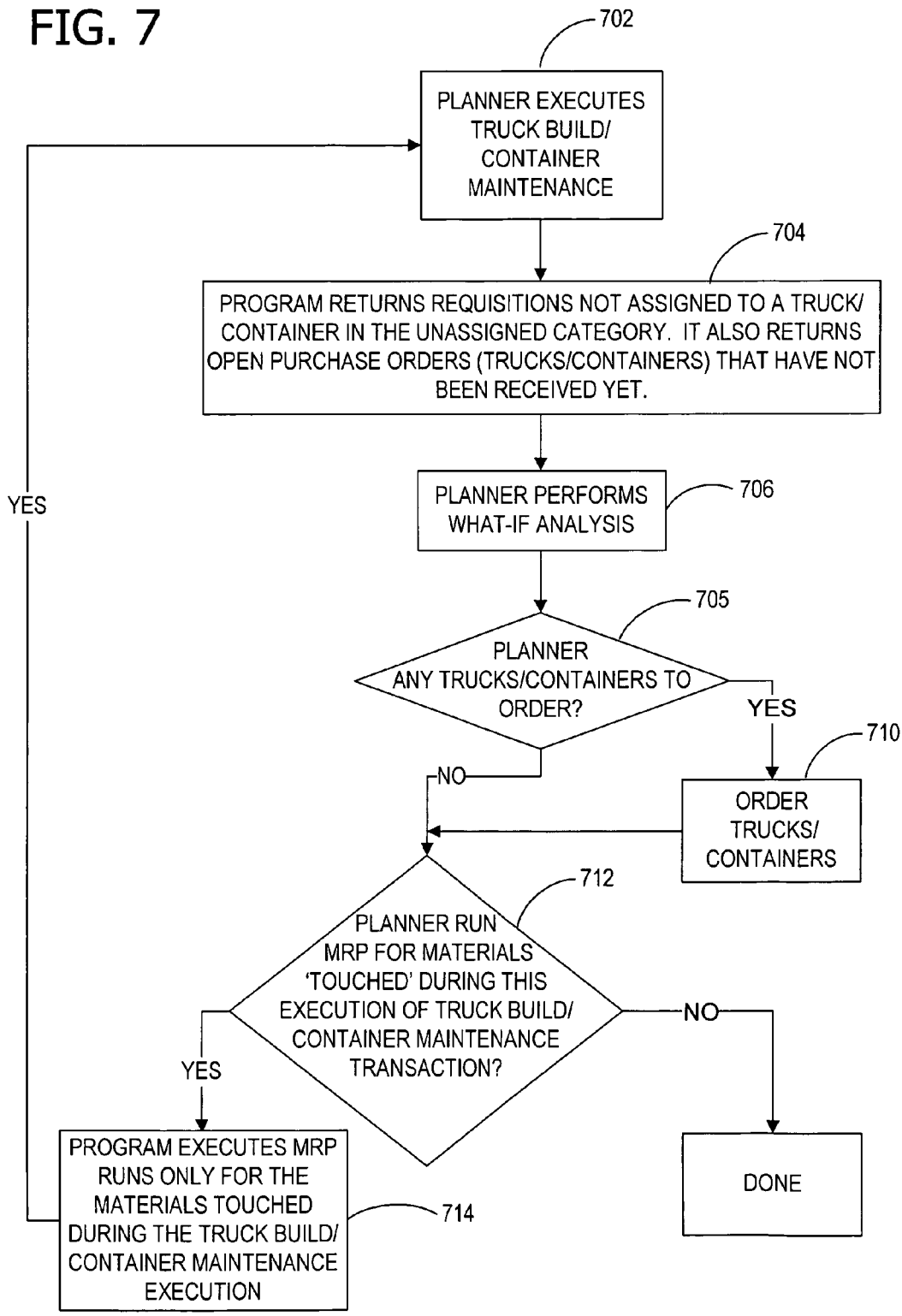

SYSTEM AND METHOD FOR BUILDING LOADS FROM REQUISITIONS

BACKGROUND OF INVENTION

The invention generally relates to a system and method for segmenting a series of shipments into loads. In particular, the invention builds optimum loads from multiple requisitions of multiple dates of multiple items which are being transferred from the same origin to the same destination.

The ordering of items such as materials or supplies from external vendors or in the transport of such items from one location to another, the issue of how one builds the shipment to define individual loads that can be transported poses a problem that has not been adequately solved in existing commercial software systems. Previously, existing programs for load building to be delivered by truck, ship container, railcar, truck or other means (herein generally referred to as truck builds) have not been adapted to work efficiently with Enterprise Resource Planning (ERP) system's Material Requirements Planning (MRP) processes such as distributed by SAP Corporation (Systems, Applications and Products Corporation). This has resulted in lost opportunities or extensive manual efforts. The long-standing need of tools for optimizing truck builds within ERP systems is addressed by this invention.

To illustrate the need for optimizing truck builds, consider the case of ordering supplies to keep a mill operation running. For example, if there are 16 different raw materials needed, one could order a 30-day supply for each of the 16 materials and have 16 trucks each deliver a 30-day supply of one raw material to the mill. Alternatively, one could order a daily truck filled with one day's supply of all 16 materials, requiring 30 truck deliveries. The former solution requires a 30-day inventory of materials delivered by 16 trucks, with added labor to move nearly all of the materials in and out of storage, while the latter solution approaches a "just-in-time" scenario in which one truck makes 30 deliveries of the materials, each for one day's production, delivered shortly before they are used.

SUMMARY OF THE INVENTION

The present invention interfaces with SAP purchase order systems to consolidate the requisitions for a single destination from a single origin into purchase orders based on optimized loads. Rather than sending huge purchase orders to single vendors, the actual needs of the location are taken into account to generate instructions on how a truck is filled to optimize the truck build. A computer assisted tool selects which items should be on a truck and directs that the truck is optimally built and scheduled, with all pertinent information being incorporated into the SAP system. And, since all materials are required at a given time, the entire truck/container can be unloaded at one time, thus improving the efficiency of warehousing/delivery process.

In one embodiment the invention comprises a method in which the Material Requirements Planning (MRP) run initially runs and creates the planned orders/requisitions. Unchanged orders/requisitions are generally re-planned every time the MRP process is run, e.g., delete and insert or updated (as appropriate).

The load build program creates the loads based on the requisitions, e.g., a truck with lines. The operator may perform a "what-if" analysis against the recommended loads. This includes moving requisitions TO and FROM trucks, as well as un-assigning requisitions, changing requisition quantities, changing the truck/container's delivery date (thus changing all requisitions on the truck to the same delivery date), etc. The operator has the ability to view the affect of the loads (time and quantity changes) as part of the material's projected available balance. Truck build containers and their requisitions are saved to the system as "unfirmed", thus allowing MRP to re-plan those requisitions. The operator then chooses which requisitions (trucks/containers) are to be ordered from the vendor. These loads are then migrated to a purchase order. During the truck build/container build process, the requisitions may have had changes done to them. Because of this, the planner may want to re-plan ONLY those materials that have had requisition changes, thus they can rerun MRP to re-plan those materials, and only those materials.

In one form, the invention is a method of optimizing loads to be delivered on a particular date to a particular destination in response to a plurality of requisitions for various items to be delivered from various vendors to various destinations. Requisitions to be delivered on or after the particular date to the particular destination from the same vendor are identified. The identified requisitions are organized in a chronological order beginning with the particular date. Beginning with the first requisition in the chronological order and considering subsequent requisitions in chronological order, the requisitions are organized into loads by consolidating at least some of the requisitions to create one or more optimized loads and/or a partial load. When the consolidated requisitions result in a partial load, at least one or more of the requisitions subsequent to the requisition corresponding to the partial load are consolidated with the partial load until an optimized load is determined thereby creating a delivery schedule of optimized loads consolidated from the requisitions.

In another form, the invention is a method of optimizing loads to be delivered on a particular date to a particular destination from a plurality of requisitions for various items from various vendors for various destinations. Requisitions to be delivered on or after the particular date to the same destination from the same vendor are identified. The identified requisitions are organized in a chronological order. Beginning with the first requisition in the chronological order and considering subsequent requisitions in chronological order, items of the requisitions are consolidated to form optimized loads.

In another form, the invention is a method of consolidating a plurality of requisitions for various items from various vendors to be delivered to various destinations on or after a specified date to create one or more truckloads, each for delivery on the specified date or thereafter. Future requisitions from a particular vendor to a particular destination are identified. The identified requisitions are organized in a chronological order beginning with the specified date. One or more requisitions for delivery on the specified date are consolidated into one or more optimized load and a partial load. The partial load is consolidated with at least part of a requisition for delivery on a date subsequent to the specified date and assigning the specified date as the delivery date for the consolidated partial load.

In another form, the invention is computer readable medium including instructions for consolidating a plurality of requisitions for various items from various vendors to be delivered to a various destinations on or after a specified date to create one or more truckloads, each for delivery on the specified date or thereafter. The instructions comprise instructions for:

Identifying future requisitions from a particular vendor to a particular destination;

Organizing the identified requisitions in a chronological order beginning with the specified date;

Consolidating one or more requisitions for delivery on the specified date into one or more optimized load and a partial load;

Consolidating the partial load with at least part of a requisition for delivery on a date subsequent to the specified date and assigning the specified date as the delivery date for the consolidated partial load.

Other objects and features will be in part apparent and in part pointed out hereinafter.

BRIEF DESCRIPTION OF THE DRAWINGS

FIG. 7 is a flow chart illustrating the maintaining/modifying process according to one embodiment of the invention.

Corresponding reference characters indicate corresponding parts throughout the drawings.

DETAILED DESCRIPTION OF THE INVENTION

The invention comprises a system and method of optimizing loads to be delivered on a particular day to a particular location in response to requirements for various items to be delivered from various vendors to various locations. As used herein, truck, load and container are used interchangeably to mean any shipment transported by any means. Although there is a standard size of the trucks and the examples below assume trucks of the same size, it is contemplated that the system of the invention may be configured to be used with trucks with various capacities. Thus, trucks of any size can be used, and loads of any size or varying size may be developed, so that the invention may be used with a fleet of trucks which includes trucks with two or more different capacities. It is also contemplated that the choice of truck can be optimized as well depending on the various parameters noted below, such as Minimum Total Order Quantity, Minimum Incremental Order Quantity, Maximum Order Quantity or Optimum Order Quantity (see Table 1).

The plurality of requisitions 102 are created in an MRP/ERP system 104 which keeps track of item's current on-hand, demand and supply and creates replenishment orders (planned orders and requisitions). An ERP system keeps track of a material's/item's current inventory position as well as projecting out into the future the material's/item's projected on-hand (Projected-Available-Balance=current inventory position−demand+supply in a timed-phased manner). A load building system 106 according to the invention uses the MRP requisitions to create optimized loads for delivery at a particular location. In one embodiment, the system 106 includes a separate computer system that includes a processor for executing software instructions (see FIG. 2) for implementing the invention. In another embodiment, the system 106 may be integrated with the ERP system 104 and/or may be one or more software programs on a computer readable medium executed by the ERP processor either concurrently or independently of the ERP software program.

Figure 1:
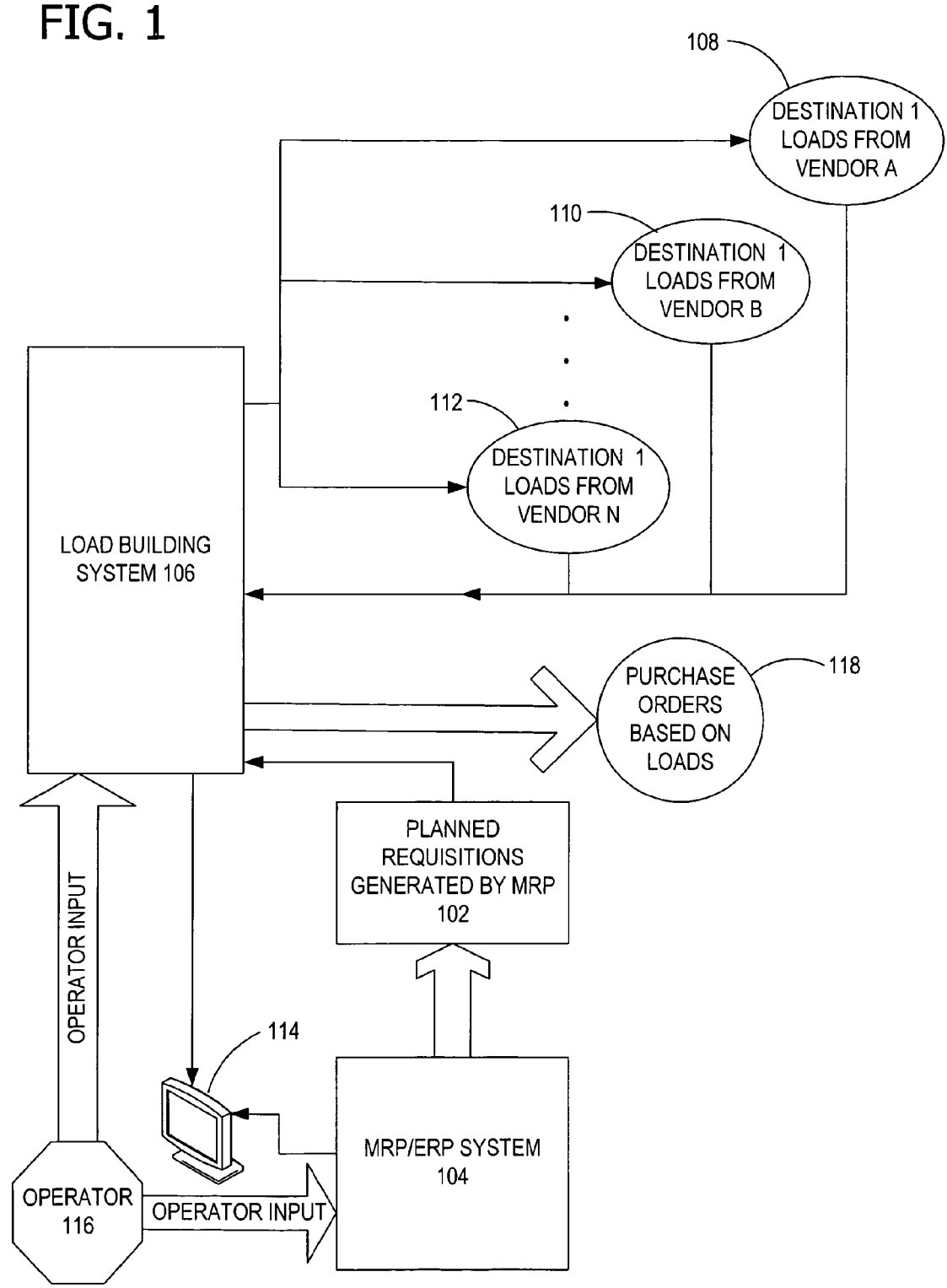
FIG. 1 is a block diagram illustrating an ERP system and a load building system according to the invention in combination with the ERP system.

In particular, the load building system 106 identifies requisitions to be delivered on or after a particular day to a particular destination from the same origin (e.g., same vendor, ship-from location). For example, as illustrated in FIG. 1, the load building system 106 collects all the planned requisitions for ship-to destination 1, from vendor A as indicated by reference character 108. It also collects all the loads for delivery to destination 1 from vendor B at 110 and so on including loads for delivery to ship-to destination 1, from vendor N at 112. Similarly, requisitions to other destinations (e.g., destination 2, 3, etc.) from vendors A-N are identified and organized separately. Thus, system 106 collects the requisitions for the destinations from each vendor. Other ways of identifying and organizing are also contemplated, such as identifying and collecting by the ship-from location. For each collection of requisitions, 108, 110 and 112, the requisitions are organized in chronological order beginning with the particular day from which the evaluation is being established. Beginning with the first requisition in the chronological order and considering each requisition thereafter in chronological order, the line item within each requisition is consolidated to create one or more optimized loads or to create a partial load. When the consolidated items of a particular requisition result in a partial load, a line item from the next requisition in chronological order is consolidated with the partial load until an optimized load is again defined. As a result, this process of consolidating a requisition's line item within a requisition and an item from one requisition to the next requisition in chronological order creates a delivery schedule of optimized loads consolidated from one or more requisitions. This delivery schedule is then provided to the MRP/ERP system 104 for display on display 114. This allows an operator 116 to conduct a "what-if" analysis where the operator can view the various recommendations from the load building system 106. At this point the operator 116 may add lines, delete lines or change lines or dates from the particular order. The operator may have the ability to view the loads in the material's projected available balance. As a result of operator input, the loads or the revised loads are saved to the ERP system as "unfirmed." As a result, the MRP/ERP system 104 works with the load building system 106 to specify a plurality of purchase orders 118 which are based on the optimized loads as optionally edited by any operator input.

The system and method of the invention allows each delivery point to have a just-in-time inventory which is minimized and allows both the supplying sites and receiving sites to minimize their inventory on hand and avoid the need for expedited shipping such as by transporting by air. In general, when a vendor supplies material to a particular location, if the vendor only supplies one material, it is fairly easy to configure the order rules in the system to make sure that each order is an optimized truck load. Generally an optimized truck load is a full truck load all though it is also contemplated that an optimized truck load may be less than a full truck load such as a truck load within the range of 75-100% of a full load. However, the issue becomes more complex when the vendor supplies multiple items to a particular location. For example, consider a situation where a vendor supplies three items A, B and C to a particular destination. There are at least three options which can be applied to delivery of these three items. In a first option, the vendor could plan to deliver full truck load quantities of each material so that a full truck load of material A would be delivered as needed, a full truck load of material B as needed and a full truck load of material C as needed, each delivered independent of the other based on the needs of the destination receiving the items. A second option would let the vendor decide how to load the trucks in which case the vendor may mix materials A and B at one point or B and C at another point for convenience or based on the vendor's inventory. According to one aspect of the invention, the system and method of the invention builds loads that allow multiple items on one truck or within a single load according to the needs of the destination.

Consider the following example. Assume that materials A, B and C have the following demand and truck load quantities as indicated by Table 1.1.

TABLE 1.1

| | Demand | | | | | |
|---|---|---|---|---|---|---|
| | Truckload Quantities | | | | | |
| | 10000 | | 8000 | | 10000 | |
| Date | Material A | % of Truck | Material B | % of Truck | Material C | % of Truck |
| Day 1 | 4000 | 40% | 4000 | 50% | 2000 | 20% |
| Day 2 | 4000 | 40% | 4000 | 50% | 2000 | 20% |
| Day 3 | 4000 | 40% | 4000 | 50% | 2000 | 20% |
| Day 4 | 4000 | 40% | 4000 | 50% | 2000 | 20% |
| Day 5 | | | 4000 | 50% | | |
| Totals: | 16000 | | 20000 | | 8000 | |

The first option noted above is illustrated in Table 1.2. Six truck loads would be ordered with one material on each truck. This would require that the destination unload three trucks on day one in order to support the first day of production. It would also result in six truck loads delivered to the destination including 1.1 trucks worth of air or empty truck. This option would also result in three different purchase orders assuming the purchase orders are consolidated into one day's worth of orders. The result is multiple trucks per purchase order which also means that purchase orders have to be reconciled against multiple shipments.

TABLE 1.2

| | Option 1 Full truckload orders placed for each material | | | | | | Truck loads | Trucks Received | Trucks Unloaded |
|---|---|---|---|---|---|---|---|---|---|
| Date | | | | | | | | | |
| Day 1 | 10000 | Order 1 | 8000 | Order 2 | 8000 | Order 3 | 2.8 | 3 | 3 |
| Day 2 | | | | | | | | | |
| Day 3 | 6000 | Order 4 | 8000 | Order 5 | | | 1.6 | 2 | 2 |
| Day 4 | | | | | | | | | |
| Day 5 | | | 4000 | Order 6 | | | 0.5 | 1 | 1 |
| Totals: | 16000 | | 20000 | | 8000 | | 4.9 | 6 | |

TABLE 1.3

| | Option 2 Vendor decide | | | | | | Truck loads | Trucks Received | Trucks Unloaded |
|---|---|---|---|---|---|---|---|---|---|
| Date | | | | | | | | | |
| Day 1 | 4000 | Order 1 | 4000 | Order 5 | 2000 | Order 10 | 1.1 | 2 | 2 |
| Day 2 | 4000 | Order 2 | 4000 | Order 6 | 2000 | Order 11 | 1.1 | 2 | 2 |
| Day 3 | 4000 | Order 3 | 4000 | Order 7 | 2000 | Order 12 | 1.1 | 2 | 2 |
| Day 4 | 4000 | Order 4 | 4000 | Order 8 | 2000 | Order 13 | 1.1 | 2 | 2 |
| Day 5 | | | 4000 | Order 9 | | | 0.5 | 1 | 1 |
| Totals: | 16000 | | 20000 | | 8000 | | 4.9 | 9 | |

Table 1.3 illustrates the second option where thirteen orders would be placed to the vendor. The best case scenario would result in the vendor shipping very similar to option 1. The worse case is shown in Table 1.3. According to Table 1.3, nine trucks are shipped with the equivalent of 5.1 trucks of air. This results in five purchase orders with multiple trucks per purchase order.

TABLE 1.4

Option 3 K-C Truck Build Process

| Date | | | | | Truck loads | Trucks Received | Trucks Unloaded |
|---|---|---|---|---|---|---|---|
| Day 1 | 4000 | Order 1 | 4000 | 1000 | 1 | 1 | |
| | 4000 | Order 2 | 4000 | 1000 | 1 | 1 | 2 |
| Day 2 | 2000 | Order 3 | 2000 | 5000 | 0.95 | 1 | 1 |
| Day 3 | 4000 | Order 4 | 4000 | 1000 | 1 | 1 | 1 |
| Day 4 | 2000 | Order 5 | 6000 | | 0.95 | 1 | 1 |
| Day 5 | 16000 | | 20000 | 8000 | 4.9 | 5 | |

The third option is illustrated in Table 1.4 and illustrates one embodiment of the invention. According to the invention five orders are provided to the vendor and five purchase orders are created, each purchase order has only one truck. The end result is less air, less trucks to unload, less inventory in the warehouse for the destination at any one time and ease in reconciling delivery and purchase order quantities because of the one-to-one correlation between purchase orders, trucks and receipts.

A Detailed Example: Set 1

The following tables illustrate one embodiment of the system and method according to the invention. Tables 1-10 relate to the scenario for set 1, defining the loads for trucks 1-4. The following tables assume that a normal truck is at 100%. The quantities illustrated in the tables represent a replenishment requisition that the MRP system plans for the day in question. Table 1 indicates that the minimum order quantity for material A is 100 units, that the incremental order quantity for material A is 20 units and that the maximum order quantity for A is 200 units. Similar quantities are specified for materials B and C in Table 1.

TABLE 1

| Scenario for Set 1, Truck 1: Normal truck at a 100%. | Material | Minimum Total Order Qty | Minimum Incremental Order Qty | Maximum Order Qty |
|---|---|---|---|---|
| All quantities in the grids represent a replenishment requisition that ERP planned for the day in question. For example, ERP created a planned requisition for 100 on Day 4 for Material A. | A | 100 | 20 | 200 |
| | B | 50 | 25 | 150 |
| | C | 25 | 5 | 100 |

Table 2 illustrates the MRP planned requisitions by material and day before analysis by the load building system 106 according to the invention. For example, Table 2 illustrates that on day 1, there are three requisitions: one is for 100 units of material A, another is for 75 units of material B and the last is for 40 units of material C. On day 2, Table 2 indicates two planned requisitions: one is for 50 units of material B and the other is for 25 units of material C. Day 3 includes a requisition for 100 units of B, day 4 includes a requisition for 100 units of A and day 5 includes a requisition of 25 units of C.

TABLE 2

| MRP Planned Requisitions by Material/Day b/4 the truck build run | 1 | 2 | 3 | 4 | 5 | 6 | 7 |
|---|---|---|---|---|---|---|---|
| A | 100 | | | 100 | | | |
| B | 75 | 50 | 100 | | | | |
| C | 40 | 25 | | | 25 | | |

The system and method according to the invention begins with requisition 1 on the first day and considers each subsequent requisition, consolidating materials to create one or more optimized loads or to create a partial load. Referring to Table 3, the first step is to identify the 100 items of material A which would result in a 50% truck load. Proceeding to the next requisition in Table 4, the 75 items of material B are added to the truck load which result in a truck 1 being full at a 100% load.

TABLE 3

| Build Truck 1 - Count 1 Truck 1: 50% Due on Day 1 Line 1, A, 100, 50% | 1 | 2 | 3 | 4 | 5 | 6 | 7 |
|---|---|---|---|---|---|---|---|
| A | 100 | | | 100 | | | |
| B | 75 | 50 | 100 | | | | |
| C | 40 | 25 | | | 25 | | |

TABLE 4

| Build Truck 1 - Count 2 Truck 1: 100% Due on Day 1 Line 1, A, 100, 50% Line 2, B, 75, 50% | 1 | 2 | 3 | 4 | 5 | 6 | 7 |
|---|---|---|---|---|---|---|---|
| A | 100 | | | 100 | | | |
| B | 75 | 50 | 100 | | | | |
| C | 40 | 25 | | | 25 | | |

It is now known that truck 1 is 100% full because Table 1 indicates that the maximum order quantity for material A is 200 so that an order quantity of 100 would result in a 50% truck load. Similarly, Table 1 indicates that the maximum order quantity for material B is 150 so that an order for 75 units of material B would result in a 50% truck load. Truck 1 is now full so that Table 5 continues with the scenario for set 1, truck 2. In other words, the process continues with analysis to determine the load for truck 2.

Table 5 shows that the quantity of 100 for material A and 75 for material B to be delivered at day 1 has been crossed out because that quantity has been allocated to truck 1 and created a full load for truck 1. Therefore, Table 5 continues with the process of identifying a second truck load by assigning the 40 units of material C to truck 2. This creates a 40% truck load for truck 2. As indicated in Table 1, a full truck load of material C is 100 units so that 40 units create a 40% truck load.

TABLE 5

| Build Truck 2 - Count 1 Truck 2: 40% Due on Day 1 Line 1, C, 40, 40% | 1 | 2 | 3 | 4 | 5 | 6 | 7 |
|---|---|---|---|---|---|---|---|
| A | ~~100~~ | | | 100 | | | |
| B | ~~75~~ | 50 | 100 | | | | |
| C | 40 | 25 | | | 25 | | |

According to Table 6, requisition 1 of the load being assembled includes 40 units of material C which makes up 40% of the truck load. The next requisition to be delivered in chronological order is now considered. Thus, the 50 units of material B are identified next as required for delivery during day 2. These 50 units of material B are added to truck 2 and create a 73% total truck load since 50 units of material B result in a one-third load. This is known from Table 1 which indicates that 150 units of material B are the maximum order quantity which equals one truck load.

TABLE 6

| Build Truck 2 - Count 2 Truck 2: 73% Due on Day 1 Line 1, C, 40, 40% Line 2, B, 50, 33% | 1 | 2 | 3 | 4 | 5 | 6 | 7 |
|---|---|---|---|---|---|---|---|
| A | ~~100~~ | | | 100 | | | |
| B | ~~75~~ | 50 | 100 | | | | |
| C | 40 | 25 | | | 25 | | |

The process continues as indicated by Table 7 by adding as line 3 to the truck 25 units of material C which add an additional 25% to the load of truck 2 creating a total load of 98%. Thus, looking at Tables 6 and 7, it can be seen that according to the process of the invention the orders for materials needed for day 2 with regard to materials B and C have been moved forward to day 1 as part of truck 2 in order to fill the load of truck 2. Truck 2 should deliver on day 1 because of the 40 units of material C that are needed on day 1. As previously noted, truck 1 has a full load and is carrying the 100 units of material A and the 75 units of material B.

TABLE 7

| Build Truck 2 - Count 3 Truck 2: 98% Due on Day 1 Line 1, C, 40, 40% Line 2, B, 50, 33% Line 3, C, 25, 25% | 1 | 2 | 3 | 4 | 5 | 6 | 7 |
|---|---|---|---|---|---|---|---|
| A | ~~100~~ | | | 100 | | | |
| B | ~~75~~ | 50 | 100 | | | | |
| C | 40 | 25 | | | 25 | | |

Since truck 2 is now almost full at 98%, the scenario for set 1 continues with considering the building of a load for truck 3 to be delivered on day 3 since trucks 1 and 2 will carry the full amount for days 1 and 2. Table 8 begins the load building process for truck 3 by adding 100 units of material B as the first line of the truck since this is the amount of material required next in chronological order. Notice in Table 8 that in day 1 the amounts of 100 for material A and 75 for material B have been crossed out since these amounts will be delivered by truck 1. In addition, the amounts for material C of 40 units on day 1 and material B of 50 units on day 2 along with 25 units of material C have been crossed out as these units will build the load for truck 2.

TABLE 8

| Build Truck 3 - Count 1 Truck 1: 67% Due on Day 3 Line 1, B, 100, 67% | 1 | 2 | 3 | 4 | 5 | 6 | 7 |
|---|---|---|---|---|---|---|---|
| A | ~~100~~ | | | 100 | | | |
| B | ~~75~~ | ~~50~~ | 100 | | | | |
| C | ~~40~~ | ~~25~~ | | | 25 | | |

Table 9 continues with the build process for truck 3 by adding as requisition 2 of the truck for load three 25 units of material C from day 5. These 25 units of material C are the next chronologically available amount which can be added to the truck load. The 100 units of material A scheduled for delivery on day 4 cannot be moved forward to be included in truck 3 because 100 units of material A amount to a 50% load and truck 3 already has a 67% load. Furthermore, the minimum order quantity for material A is 100 units so that the amount of 100 to be delivered for day 4 cannot be subdivided.

TABLE 9

| Build Truck 3 - Count 2 Truck 3: 92% Due on Day 3 Line 1, B, 100, 67% Line 2, C, 25, 25% | 1 | 2 | 3 | 4 | 5 | 6 | 7 |
|---|---|---|---|---|---|---|---|
| A | ~~100~~ | | | 100 | | | |
| B | ~~75~~ | ~~50~~ | 100 | | | | |
| C | ~~40~~ | ~~25~~ | | | 25 | | |

Referring to Table 10, all the quantities which have been assigned to loads previously built have been crossed out. Thus the only remaining quantity to be assigned would be 100 units of material A to be delivered on day 4. This would make up truck 4 which would be a 50% load. As a result of set 1, the system and method started with Table 2 which included requisitions for five different days. If each day had been treated separately, two truck loads would have been delivered on day 1 and one truck load on each of the remaining days 2-5 for a total of six truck loads. Alternatively, if the materials had been organized and delivered on a material-by-material basis, one truck load would have been required for material A, two truck loads would have been required for material B and one truck load would have been required for material C. Three of the four truck loads would have to have been delivered on the first day in order to provide sufficient inventory for materials A, B and C. In contrast, according to set 1 as summarized in Table 10, three and one-half truck loads are delivered to the particular destination over a four day period to provide a just-in-time inventory.

TABLE 10

| Build Truck 4 - Count 1 Truck 4: 50% Due on Day 4 Line 1, B, 100, 50% | 1 | 2 | 3 | 4 | 5 | 6 | 7 |
|---|---|---|---|---|---|---|---|
| A | ~~100~~ |  |  | 100 |  |  |  |
| B | ~~75~~ | ~~50~~ | ~~100~~ |  |  |  |  |
| C | ~~40~~ | 25 |  |  | 25 |  |  |

A Detailed Example: Set 2

The following tables illustrate one embodiment of the system and method according to the invention. Tables 11-30 relate to the scenario for set 2, defining the loads for trucks 1-6. The following tables assume that a normal truck is at 100%. The quantities illustrated in the tables represent a replenishment requisition that the MRP system plans for the days noted. Table 1 indicates that the minimum order quantity for material A is 100 units, that the minimum incremental order quantity for material A is 20 units and that the maximum order quantity for A is 200 units. An optimum order quantity can be any number based on the numbers in Table 1. For example, an optimum for A would be a range of not more than the maximum order quantity of 200 and not less than the maximum of 200 minus the minimum incremental order quantity of 20 or 200−20=180, e.g., a range of 180-200 would be an example of an optimum order quantity for A. Similar quantities are specified for materials B and C in Table 1.

TABLE 11

| MRP Planned Requisitions by Material/Day b/4 the truck build run | 1 | 2 | 3 | 4 | 5 | 6 |
|---|---|---|---|---|---|---|
| A | 100 | 120 | 100 | 120 |  |  |
| B | 50 | 50 | 50 | 50 | 75 |  |
| C |  | 25 | 30 | 35 | 75 |  |

Table 11 illustrates the MRP planned requisitions by material and day before analysis by the load building system 106 according to the invention. For example, Table 11 illustrates that on day 1, there are two requisitions: one is for 100 units of material A, and another is for 75 units of material B. On day 2, Table 11 indicates three planned requisitions: one for 120 units of material A, one for 50 units of material B and the other is for 25 units of material C. Day 3 includes requisitions for 100 units of A, for 50 units of B, and 30 units of C. Day 4 includes requisitions for 120 units of A, 50 units of B and 35 units of C. Day 5 includes requisitions of 75 units of B and C.

TABLE 12

| Build truck 1 - Count 1 truck 1: 50% Due on Day 1 Line 1, A, 100, 50% | 1 | 2 | 3 | 4 | 5 | 6 |
|---|---|---|---|---|---|---|
| A | 100 | 120 | 100 | 120 |  |  |
| B | 50 | 50 | 50 | 50 | 75 |  |
| C |  | 25 | 30 | 35 | 75 |  |

The system and method according to the invention begins with requisition for each material on the first day and considers each subsequent requisition, consolidating materials to create one or more optimized loads or to create a partial load. Referring to Table 12, the first step is to identify the 100 items of material A which would result in a 50% truck load. Proceeding to the next requisition, the 50 items of material B are added to the truck load which result in a truck 1 being 83% of a full load as shown in Table 13. Proceeding to day 2 and the next requisition for material A as, 20 units of material A are moved forward to day 1 to increase the load to 93% as shown in Table 14. 20 or more units of A cannot be moved forward from day 2 to day 1 because that would leave less than the minimum of 100 units of A for day 2. All 100 units of A for day 2 cannot be moved forward from day 2 to day 1 because day 1's load would be greater than 100%.

TABLE 13

| Build truck 1 - Count 2 Truck 1: 83% Due on Day 1 Line 1, A, 100, 50% Line 2, B, 50, 33% | 1 | 2 | 3 | 4 | 5 | 6 |
|---|---|---|---|---|---|---|
| A | 100 | 120 | 100 | 120 |  |  |
| B | 50 | 50 | 50 | 50 | 75 |  |
| C |  | 25 | 30 | 35 | 75 |  |

TABLE 14

| Build truck 1 - Count 3 truck 1: 93% Due on Day 1 Line 1, A, 120, 60% Line 2, B, 50, 33% | 1 | 2 | 3 | 4 | 5 | 6 |
|---|---|---|---|---|---|---|
| A | 120 | 100 | 100 | 120 |  |  |
| B | 50 | 50 | 50 | 50 | 75 |  |
| C |  | 25 | 30 | 35 | 75 |  |

It is now known that truck 1 is 93% full and its load is optimized because none of the minimum order quantities for any of materials A, B or C as specified in Table 1 can be moved forward without creating greater than a maximum load. Adding the minimum of any of A, B, or C would result in a load of greater than 100%. Thus, no more materials or portions thereof can be moved forward to day 1.

The process continues with Table 15 and the analysis to determine the load for truck 2.

TABLE 15

| Build Truck 2 - Count 1 Truck 2: 50% Due on Day 2 Line 1, A, 100, 50% | 1 | 2 | 3 | 4 | 5 | 6 |
|---|---|---|---|---|---|---|
| A | ~~120~~ | 100 | 100 | 120 |  |  |
| B | ~~50~~ | 50 | 50 | 50 | 75 |  |
| C |  | 25 | 30 | 35 | 75 |  |

Table 15 shows that the quantity of 120 for material A and 50 for material B to be delivered at day 1 has been crossed out because that quantity has been allocated to truck 1 and created a 93% load for truck 1. Therefore, Table 15 continues with the process of identifying a second truck load by assigning the 100 units of material A to truck 2. This creates a 50% truck load for truck 2. As indicated in Table 1, a full truck load of material A is 200 units so that 100 units create a 50% truck load.

TABLE 16

Build Truck 2 - Count 2
Truck 2: 83% Due on Day 2
Line 1, A, 100, 50%

| Line 2, B, 50, 33% | 1 | 2 | 3 | 4 | 5 | 6 |
|---|---|---|---|---|---|---|
| A | ~~120~~ | 100 | 100 | 120 | | |
| B | ~~50~~ | 50 | 50 | 50 | 75 | |
| C | | | 25 | 30 | 35 | 75 |

According to Table 16, the next requisition to be delivered in chronological order is now considered. Thus, the 50 units of material B are identified next as assigned for delivery during day 2. These 50 units of material B are added to truck 2 and create a 83% total truck load since 50 units of material B result in a 33% load. This is known from Table 1 which indicates that 150 units of material B are the maximum order quantity which equals one truck load.

TABLE 17

Build Truck 2 - Count 3
Truck 2: 93% Due on Day 2
Line 1, A, 120, 60%

| Line 2, B, 50, 33% | 1 | 2 | 3 | 4 | 5 | 6 |
|---|---|---|---|---|---|---|
| A | ~~120~~ | 120 | 100 | 100 | | |
| B | ~~50~~ | 50 | 50 | 50 | 75 | |
| C | | | 25 | 30 | 35 | 75 |

The process continues as indicated by Table 17 by moving forward 20 units of item A from day 4 to day 2. Thus, looking at Tables 16 and 17, it can be seen that according to the process of the invention the orders for materials needed for day 4 with regard to material A have been moved forward to day 2 as part of truck 2 in order to increase the load of truck 2 to 93%. It is now known that truck 2 is 93% and its load is optimized because Table 1 indicates that the minimum order quantity for any of materials A, B or C. Adding the minimum of any of A, B, or C would result in a load of greater than 100%. Thus, no more materials or portions thereof can be moved

TABLE 18

Build Truck 3 - Count 1
Truck 3: 25% Due on Day 2

| Line 1, C, 25, 25% | 1 | 2 | 3 | 4 | 5 | 6 |
|---|---|---|---|---|---|---|
| A | ~~120~~ | ~~120~~ | 100 | 100 | | |
| B | ~~50~~ | ~~50~~ | 50 | 50 | 75 | |
| C | | | 25 | 30 | 35 | 75 |

Since truck 2 is now optimized at 93%, the scenario for set 2 continues with considering the building of a load for truck 3 to be delivered on day 2 since 25 units of C are due for delivery on day 2. In Table 18, the units assigned to truck loads 1 and 2 have been crossed out. Table 18 begins the load building process for truck 3 by adding 25 units of material C as the first line of the truck since this is the amount of material required next in chronological order.

TABLE 19

Build Truck 3 - Count 2
Truck 3: 75% Due on Day 2
Line 1, C, 25, 25%

| Line 2, A, 100, 50% | 1 | 2 | 3 | 4 | 5 | 6 |
|---|---|---|---|---|---|---|
| A | ~~120~~ | ~~120~~ | 100 | 100 | | |
| B | ~~50~~ | ~~50~~ | 50 | 50 | 75 | |
| C | | | 25 | 30 | 35 | 75 |

Table 19 continues with the build process for truck 3 by adding as the next requisition of the truck for load three 100 units of material A from day 3. These 100 units of material A are the next chronologically available amount which can be added to the truck load.

TABLE 20

Build Truck 3 - Count 3
Truck 3: 80% Due on Day 2
Line 1, C, 30, 30%

| Line 2, A, 100, 50% | 1 | 2 | 3 | 4 | 5 | 6 |
|---|---|---|---|---|---|---|
| A | ~~120~~ | ~~120~~ | 100 | 100 | | |
| B | ~~50~~ | ~~50~~ | 50 | 50 | 75 | |
| C | | | 30 | 25 | 35 | 75 |

The 50 units of material B scheduled for delivery on day 3 cannot be added to truck 3 because 50 units of material B amount to a 50% load and truck 3 already has an 75% load. Furthermore, the minimum order quantity for material B is 50 units so that the amount of 50 to be delivered for day 3 cannot be subdivided. However, 5 units of item C can be moved forward from day 3 to day 2, as shown in Table 20, to increase load 3 to 80%.

TABLE 21

Build Truck 3 - Count 4
Truck 3: 90% Due on Day 2
Line 1, C, 40, 40%

| Line 2, A, 100, 50% | 1 | 2 | 3 | 4 | 5 | 6 |
|---|---|---|---|---|---|---|
| A | ~~120~~ | ~~120~~ | 100 | 100 | | |
| B | ~~50~~ | ~~50~~ | 50 | 50 | 75 | |
| C | | | 40 | 25 | 25 | 75 |

Similarly, in Table 21, 10 units of item C are moved forward from day 4 to day 2 to increase load 3 to 90%. The minimum 25 units of C remain for delivery at day 4. Truck 3 now has an optimized load because no more requisition amounts or partial amounts can be moved forward.

TABLE 22

Build Truck 4 - Count 1
Truck 4: 33% Due on Day 3

| Line 1, B, 50, 33% | 1 | 2 | 3 | 4 | 5 | 6 |
|---|---|---|---|---|---|---|
| A | ~~120~~ | ~~120~~ | ~~100~~ | 100 | | |
| B | ~~50~~ | ~~50~~ | 50 | 50 | 75 | |
| C | | | ~~35~~ | 25 | 25 | 75 |

Tables 22 and 23 begin to build truck 4 and show the amounts for trucks 1-3 crossed out. The 50 units of B and 25 units of C due on day 3 are assigned to truck 4 to create a 58% load.

TABLE 23

Build Truck 4 - Count 2
Truck 4: 58% Due on Day 3
Line 1, B, 50, 33%
Line 2, C, 25, 25%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | 50 | 50 | 75 |   |
| C |   |   | ~~40~~ | 25 | 25 | 75 |

TABLE 24

Build Truck 4 - Count 3
Truck 4: 91% Due on Day 3
Line 1, B, 50, 33%
Line 2, C, 25, 25%
Line 3, B, 50, 33%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | 50 | 50 | 75 |   |
| C |   |   | ~~40~~ | 25 | 25 | 75 |

Table 24 shows that the next chronologically available subdivided amount which can be moved forward to add to truck 4 is 50 units of B due on day 4, yielding a 91% load.

TABLE 25

Build Truck 4 - Count 4
Truck 4: 96% Due on Day 3
Line 1, B, 50, 33%
Line 2, C, 30, 30%
Line 3, B, 50, 33%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | 50 | 50 | 75 |   |
| C |   |   | ~~40~~ | 30 | 25 | 70 |

Table 25 shows that the next chronologically available subdivided amount which can be moved forward to add to truck 4 is 5 units of C due on day 5 and moved up to day 3, yielding a 96% load. Truck 4 now has an optimized load because no more requisition amounts or partial amounts can be moved forward.

TABLE 26

Build Truck 5 - Count 1
Truck 5: 50% Due on Day 4
Line 1, A, 100, 50%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | ~~50~~ | ~~50~~ | 75 |   |
| C |   |   | ~~40~~ | ~~30~~ | 25 | 70 |

Tables 26 and 27 begin to build truck 5 and show the amounts for trucks 1-4 crossed out. The 100 units of A and 25 units of C due on day 4 are assigned to truck 5 to create a 75% load.

TABLE 27

Build Truck 5 - Count 2
Truck 5: 75% Due on Day 4
Line 1, A, 100, 50%
Line 2, C, 25, 25%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | ~~50~~ | ~~50~~ | 75 |   |
| C |   |   | ~~40~~ | ~~30~~ | 25 | 70 |

TABLE 28

Build Truck 5 - Count 3
Truck 5: 100% Due on Day 4
Line 1, A, 100, 50%
Line 2, C, 50, 50%

|   | 1 | 2 | 3 | 4 | 5 | 6 |
|---|---|---|---|---|---|---|
| A | ~~120~~ | ~~120~~ | ~~100~~ | 100 |   |   |
| B | ~~50~~ | ~~50~~ | ~~50~~ | ~~50~~ | 75 |   |
| C |   |   | ~~40~~ | ~~30~~ | 50 | 45 |

Table 28 shows that the next chronologically available subdivided amount which can be moved forward to add to truck 5 is 25 units of C due on day 5 and moved up to day 4, yielding a 100% load. Truck 4 now has an optimized load.

TABLE 29

Build Truck 6 - Count 1
Truck 6: 50% Due on Day 5
Line 1, B, 75, 50%

|   | 1 | 2 | 3 | 4 | 5 | 6 |
|---|---|---|---|---|---|---|
| A | ~~120~~ | ~~120~~ | ~~100~~ |   |   |   |
| B | ~~50~~ | ~~50~~ | ~~50~~ | ~~50~~ | 75 |   |
| C |   |   | ~~35~~ | ~~25~~ | ~~25~~ | 45 |

Tables 29 and 30 build truck 6 and show the amounts for trucks 1-5 crossed out. The 75 units of B and 45 units of C due on day 5 are assigned to truck 6 to create a 95% load.

TABLE 30

Build Truck 6 - Count 2
Truck 6: 95% Due on Day 5
Line 1, B, 75, 50%
Line 2, C, 45, 45%

|   | 1 | 2 | 3 | 4 | 5 | 6 |
|---|---|---|---|---|---|---|
| A | ~~120~~ | ~~120~~ | ~~100~~ | ~~100~~ |   |   |
| B | ~~50~~ | ~~50~~ | ~~50~~ | ~~50~~ | 75 |   |
| C |   |   | ~~35~~ | ~~25~~ | ~~25~~ | 45 |

This ends set 2 building trucks 1-6. As is illustrated in both sets 1 and 2, which items can be moved forward and consolidated with other items of an earlier requisition(s) depend upon a number of criteria such as the criteria illustrated in Table 1. For example, Table 1 defines a minimum incremental order quantity for each item. Thus, at least 20 items of A, 25 of B and 5 of C must be moved forward. Table 1 also defines a minimum order quantity for each item. Thus, the minimum order for A is 100, B is 50 and C is 25. This means the order for any one day must be at this minimum. Thus, if the order for a particular day is at the minimum, it cannot be moved forward unless the entire amount can be moved forward. If the order for any one day is over the minimum, a portion of it can be moved forward if the portion is at least the size of the increment order quantity and if the remaining portion is at least the minimum. Table 1 also defines a maximum order quantity for each item. Thus, the maximum order for A is 200, for B is 150 and for C is 100. This maximum is usually equivalent to a full truck load, although it does not have to be a full load. Optionally, the system may employ an operator or automatically defined time-horizon to build a truck. For example, if the horizon to consolidate requisitions for a ship-to/vendor relationship is four days, the system will 'stop' considering requisitions with a delivery date greater than four days after the truck build's order/delivery date. In particular, assume a truck build order's delivery date is 05/12, and for this ship-to/vendor (supplier) relationship there is a 3 day order horizon, the truck build logic will NOT consider (modify or move) any requisitions with a delivery date of 05/16 or greater onto the 05/12 truck.

Figure 2:
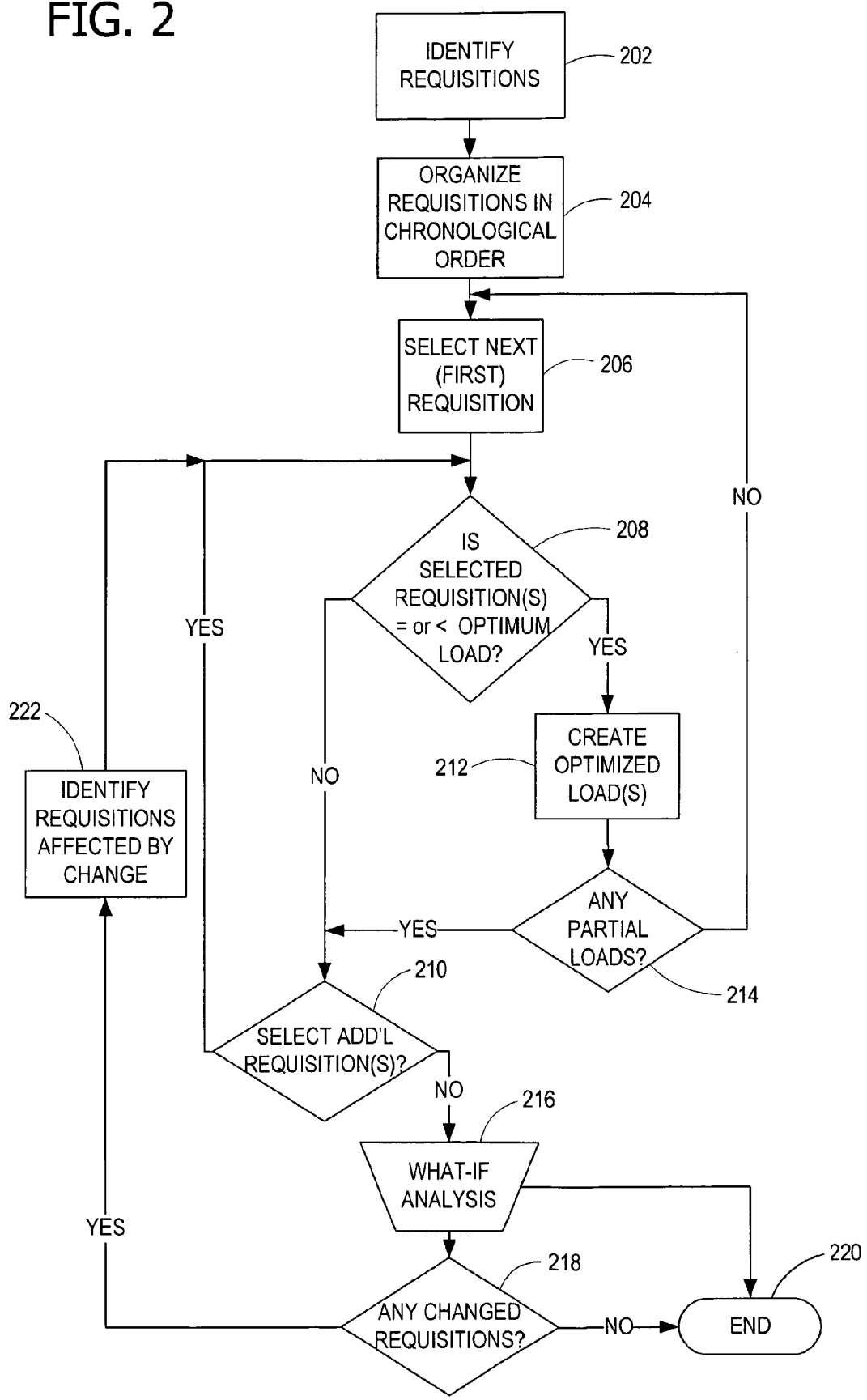
FIG. 2 is a flow chart illustrating the operation of the load building system and method according to the invention.

Referring to FIG. 2, a flow chart, illustrating the process according to one embodiment of the invention for moving forward requisitions or parts of requisitions is illustrated. Initially, the MRP knows the inventory at any one starting point in time, knows the orders to be filled for each item at subsequent points in time and thus knows the demand for inventory at subsequent points. Accordingly, the MRP is either run on a nightly basis or as needed to plan replenishment orders (planned orders/requisitions) at 202 and to organize the requisitions in chronological order at 204. After organizing, the first requisition (or the next requisition if this is a repeat of the loop illustrated in FIG. 2) is selected at 206. At 208, it is determined whether the selected requisition requires a delivery which is equal to or greater than the optimum load. If the selected requisition is less than the optimum load, the process proceeds to 210 where the next requisition(s) in chronological order is selected. The process returns to 208 to determine whether or not the selected requisitions together create a load which is greater than the optimum load. When a load greater than the optimum load is created by the selected requisitions, the process proceeds to 212 to create one or more optimized loads according to the process as outlined above. For example, the requisitions are consolidated as noted above according to a minimum incremental order quantity for each item, according to a minimum total order quantity for each item, according to an optimum order quantity for each item and according to a maximum order quantity for each item. After this loop, if there are no partial loads as determined at 214 the process returns to 206 to select the next requisition. If there are any partial loads, the process proceeds with 210 to select additional one or more requisitions which can be moved forward and combined with the partial load to create optimum loads. This respects the ship-to/suppliers truck build horizon to ensure the process does not 'pull in' replenishment quantities/requisitions sooner than the planner requires.

Although FIG. 2 illustrates that a what-if analysis may occur after no more additional requisitions are selected at 216, it is contemplated that the what-if analysis can be accomplished at any point in the process or separately after particular purchase orders or requisitions have been amended. This will be explained below in greater detail. After the what-if analysis at 216, there is a determination made at 218 as to whether any changes have been made which would require further action. If there are no changes, the load building process ends at 220. If there have been changes, the load building process proceeds to 222 to identify requisitions affected by the change which would generally mean the earliest chronologically dated requisition and any requisitions subsequent thereto. From 222 the process proceeds back to 208 to select optimum loads.

Figure 3:
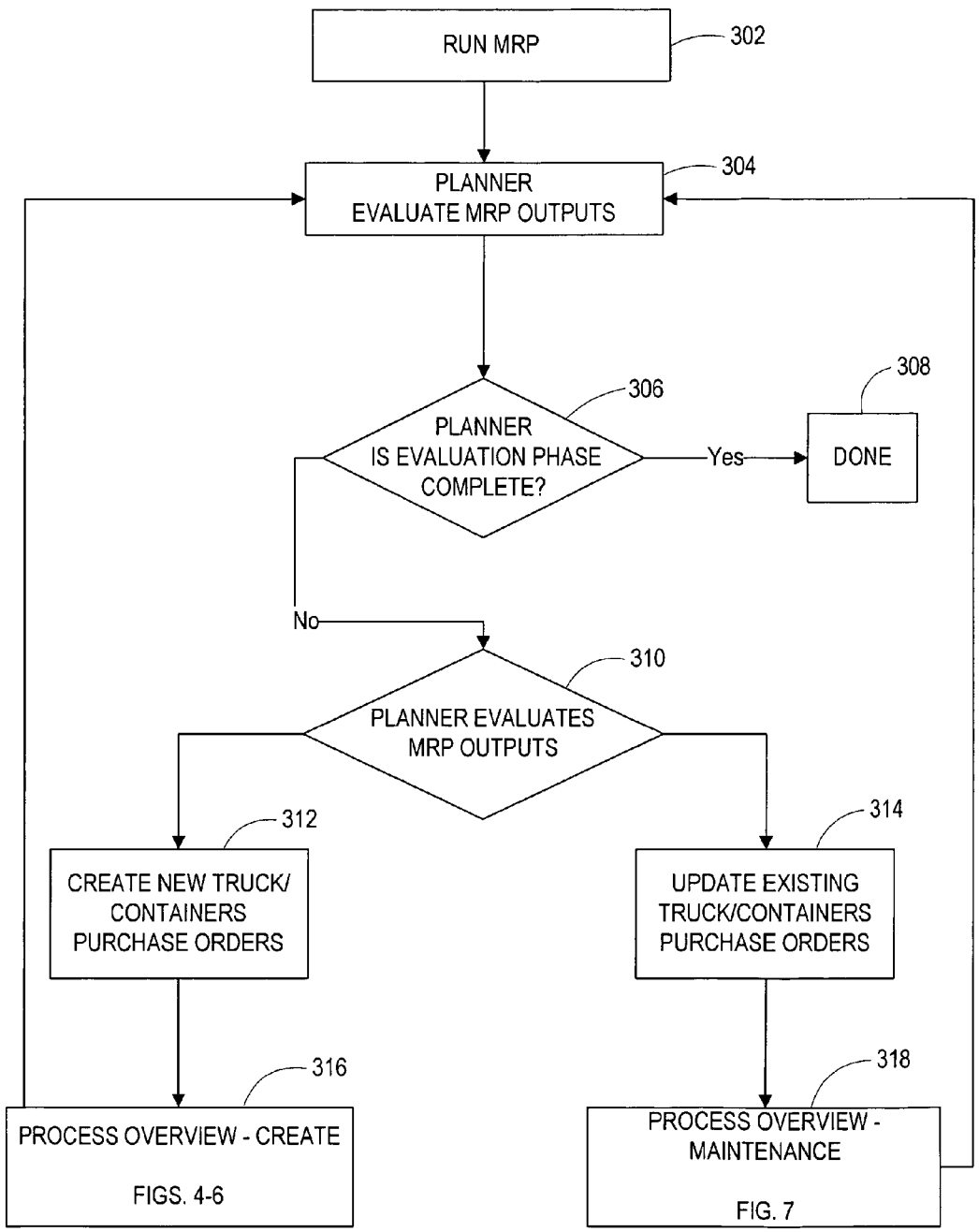
FIG. 3 is a flow chart illustrating an overview of the running of the MRP process which drives the planner's Evaluation Process. Within the Evaluation Process, the planner determines when to build new loads (create Purchase Orders) or modify existing loads (existing Purchase Orders).

FIG. 3 is a flow chart illustrating an overview of the running of the MRP system and a preliminary determination as to whether or not to create loads or to maintain/modify loads. FIG. 3 begins at 302 with the running of the MRP system. Generally, the MRP would be executed at night or would be executed by clients who run the system on an on-line basis. The operator 116 such as a planner would then evaluate the MRP outputs at 304 by viewing the resulting requisitions on display 114. When the planner evaluates the MRP output at 304, the planner determines whether or not there is a need to update an existing purchase order or to create new truck container purchase orders. This is done by evaluating based on a ship-to location and for each ship-to location by supplier (either external or internal).

At 306, it is determined whether or not the planner has completed evaluation of the outputs. If so, the planner is done at 308. Otherwise, the planner proceeds to 310 to decide whether to evaluate outputs by creating new truck/container purchase orders at 312 or by updating existing truck container purchase orders at 314. As illustrated, the creation process is more particularly illustrated in FIGS. 4-6 as indicated by 316 or the maintenance/modification process is illustrated in more detail by FIG. 7 as indicated at 318.

Figure 4:
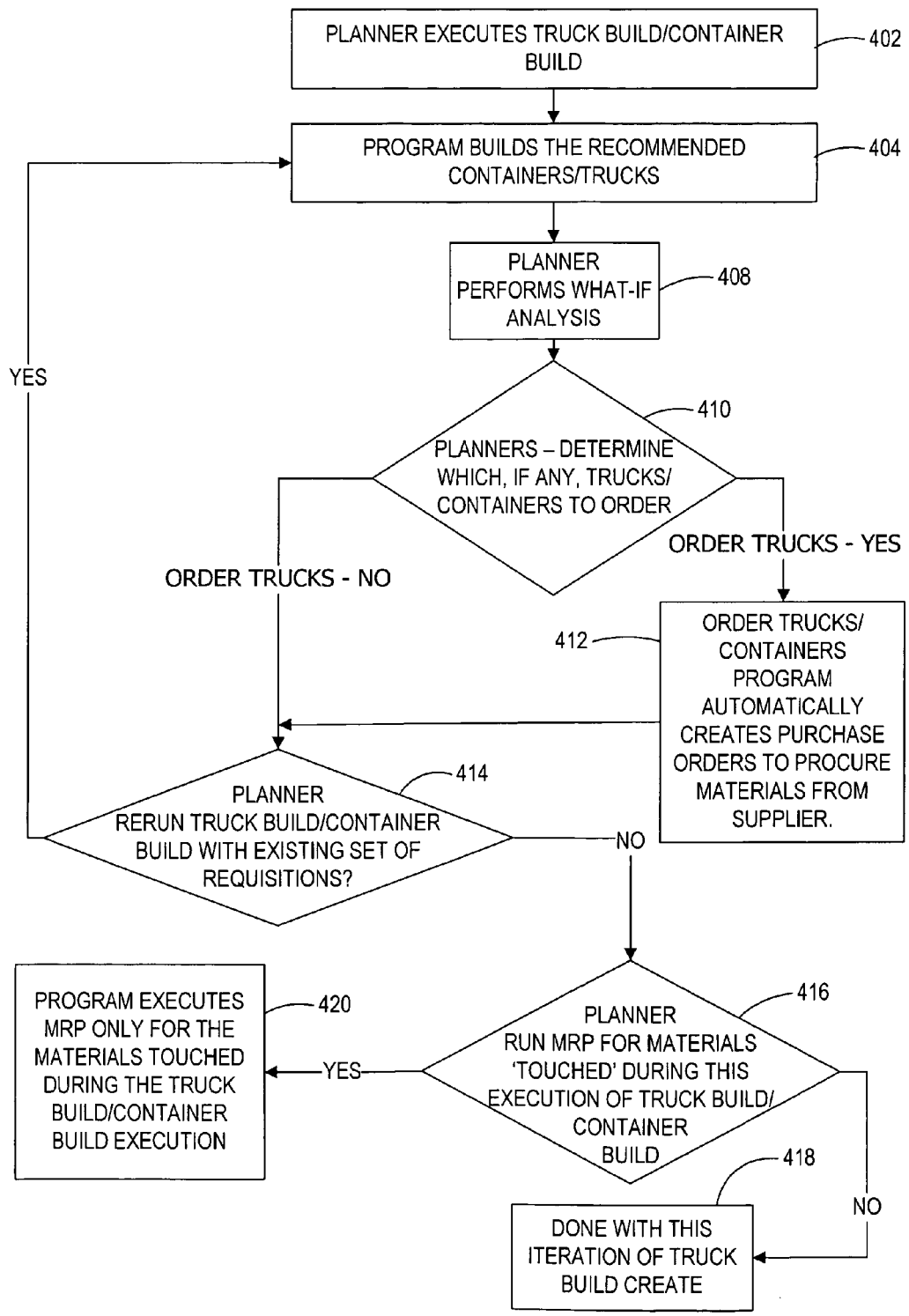
FIGS. 4-6 are a flow chart illustrating the load building process according to one embodiment of the invention.

As indicated at 402, FIG. 4 illustrates the process of the planner executing the truck build/container build process. Initially, the load building system 106 is executed to build the recommended containers/trucks at 404. This is accomplished by selecting a ship-to receiving location such as the plant requiring the materials. In addition, a supply-from source is selected such as an external vendor or an internal vendor (e.g., an interplant transfer of materials from one plant to another). In addition, an end date or horizon to build the trucks/containers is identified (e.g., from today's date through three weeks from today). Thus, the system 106 executes and builds optimized trucks/containers and returns those trucks/containers for their planner to review and take action upon. In the examples as noted above and as used herein, it is assumed that a container contains one or more requisitions and that a requisition only contains one material such as one replenishment order. However, those skilled in the art would readily recognize that more complex scenarios may be employed by this invention.

At 408 the planner performs a what-if analysis. This is an option and is described in more detail with respect to FIG. 7 below.

After the what-if analysis, if any, the planner proceeds to 410 to determine which, if any, trucks/containers to order. If trucks are identified for ordering, the planner proceeds to 412 to order the trucks/containers according to the program which automatically creates purchase orders to procure materials from the supplier. If the planner decides not to generate purchase orders, the process proceeds to 414 in which case the planner has the option to re-run the truck build/container build with an existing set of requisitions by returning to 404. Otherwise, the planner proceeds to 416 where the planner again runs the MRP for materials touched or modified during the execution of the truck build/container build. At 418 the planner is done with this iteration of the truck build create process. If it is determined at 416 that materials have been touched, the process proceeds with 420 wherein the program executes the MRP only for the materials touched during the truck build/container build execution. Optionally, this may also mean that the program executes for all materials and requisitions subsequent to the requisitions that are affected by the touched materials. After running the MRP, the program returns to the truck build's selection window.

Figure 5:
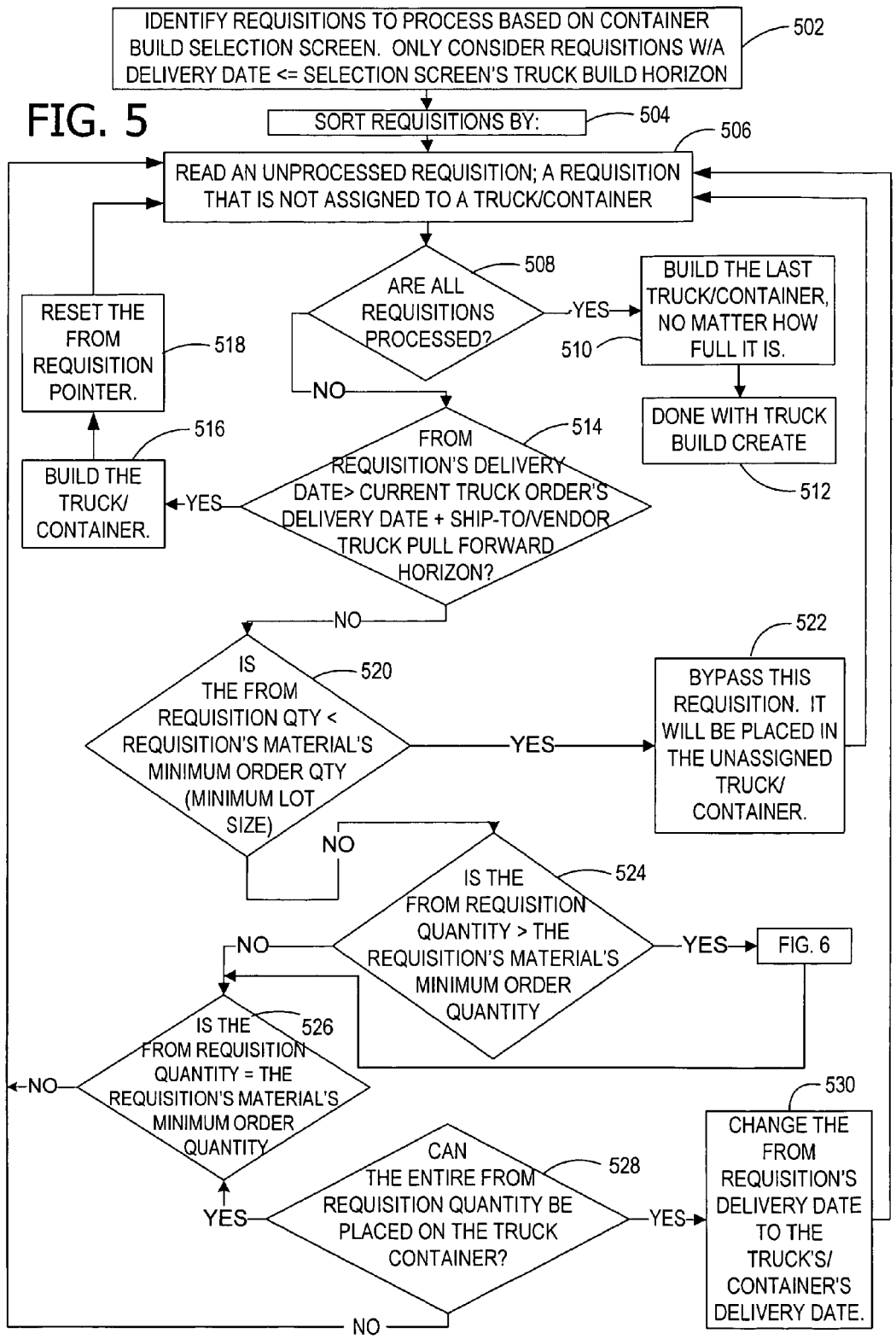
Figure 6:
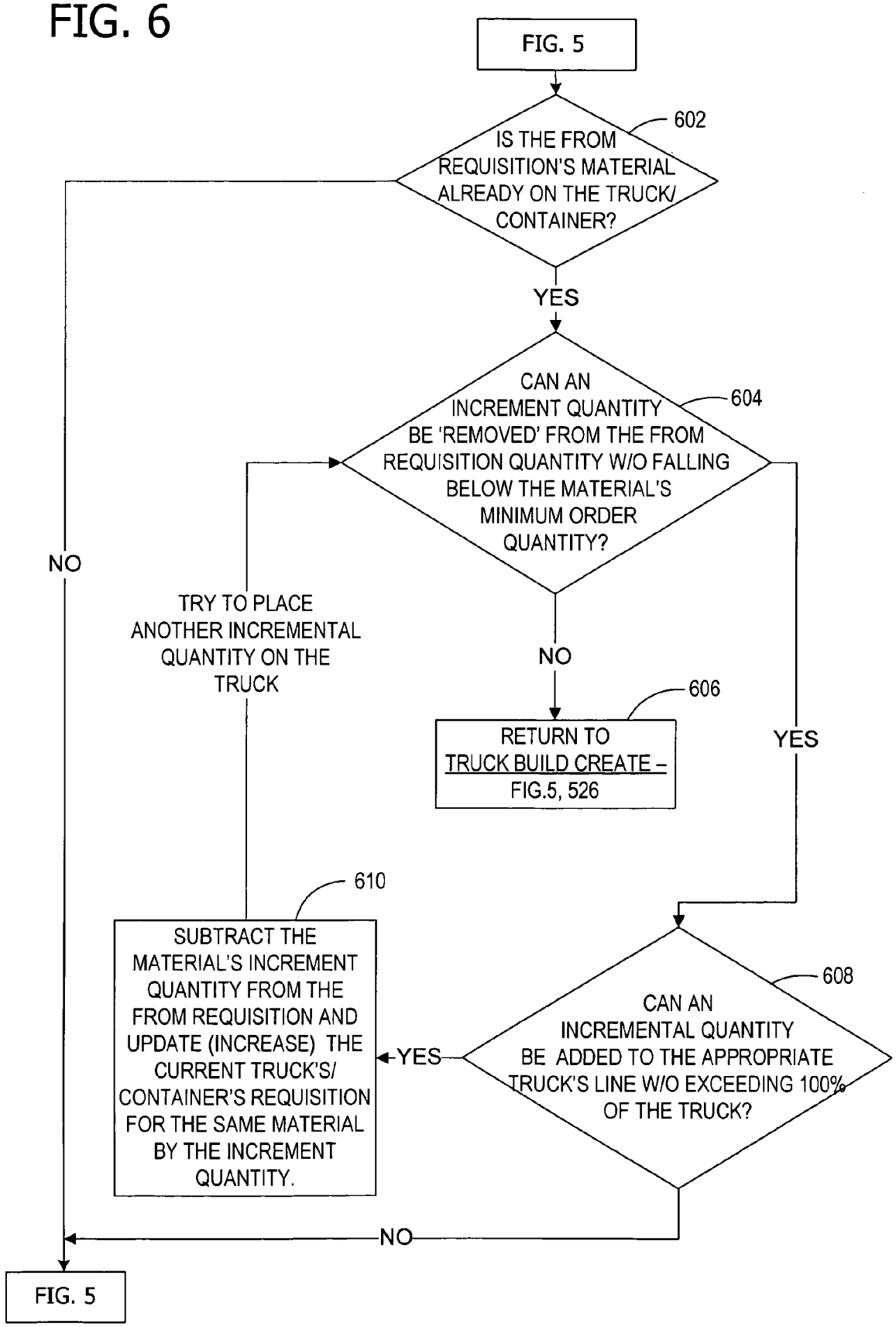

Referring to FIG. 5, the truck build/create process is described in greater detail. Essentially, FIGS. 5 and 6 are an alternative embodiment to the invention as illustrated with respect to FIG. 2. At 502, the system 106 identifies requisitions to process based on the container build selection screening including ship-to location (receiving/requesting site), shipped-from vendor/location, and horizon date to build containers (requisitions must have a delivery date; this date is to be considered in the truck build/container build logic). Preferably, the system would only consider and process unreleased requisitions. Further, it is contemplated that the system would only consider requisitions with a delivery date less than or equal to a truck build horizon, as displayed on the selection screen.

At 504 the system sorts the requisitions by various parameters such as contract/agreement number (to differentiate a vendor's ship-from location because vendors can have more than one ship-from location), requisition delivery date and requisition material/item. In particular, at 506 the system reads an unprocessed requisition which is a requisition that is not assigned to a truck/container referred to hereinafter as the requisition. At decision step 508 the system determines whether all the requisitions have been processed. If they have, the last truck/container is built regardless of how full it is and the process is done with the truck build create process at 512.

If not all of the requisitions have been processed at 508, the process proceeds to 514 to determine if the "from" requisition delivery date is greater than the current truck order delivery date plus the ship-to/vendor truck pull forward horizon. In general, only requisitions with dates from the start date to the end date which defines the horizon are considered. If the date is within the range, the system builds the truck/container at 516 and resets the "from" requisition pointer at 518 to force the re-reading of all unprocessed requisitions by contract/vendor requisition delivery date and material. Thus, the process would proceed back to 506. If the delivery date is within the horizon as determined at 514, the process proceeds to 520 where it is determined whether the "from" requisition quantity is less than the requisition materials minimum order quantity (minimum lot size). If it is, the process proceeds to 522 to bypass the requisition and the process returns to read an unprocessed requisition at 506. The requisition will be placed in an unassigned truck/container. If the quantity is not less, the process proceeds to 524 to determine if the requisition quantity is greater than the requisition material's minimum total order quantity. If it is greater, the process proceeds to FIG. 6. Otherwise, if it is less, the process proceeds to 526 to determine if the "from" requisition quantity is equal to the requisition materials minimum order quantity. If it is, the entire "from" requisition quantity is placed on a truck at 528 and the "from" requisition delivery date is changed to the truck's/container's delivery date. At 530 the percentage full of truckload/container is also updated and the process returns to read an unprocessed requisition at 506.

Referring to FIG. 6, which proceeds from FIG. 5 at 524 where it has been determined that the "from" requisition quantity is greater than the requisition materials minimum order quantity, is determined at 602 if the "from" requisition material is already on the truck/container. If it is, the process proceeds to 604 to try to place another incremental quantity on the current truck/container. In particular, at 604 it is determined as to whether an incremental quantity can be removed from the "from" requisition quantity without falling below the materials minimum order quantity. If it cannot, 606 returns to the process of FIG. 5 at 526. If it can, the process proceeds to 608 where it is determined if an incremental quantity can be added to the appropriate truck's line without exceeding 100% of the truck. If it can, the process proceeds to 610 to subtract the materials increment quantity from the "from" requisition and update (increase) the current truck's requisition for the same material by the increment quantity. The process then returns to 604 to try to place another incremental quantity on the truck. If at 602 the "from" requisitions material is not on the truck/container or if at 608 there's not enough room on the truck, the process returns to FIG. 5.

Referring to FIG. 7, the process of maintaining or modifying purchase orders in one embodiment including a what-if analysis is illustrated. At 702, the planner executes the truck build/container maintenance by proceeding to select the ship-to receiving location (the plant requiring the materials), by selecting the supply-from source (external or internal vendor), and by selecting the end date or horizon to select requisitions/open purchase orders (trucks). At 704, the program returns requisitions not assigned to a truck/container in the unassigned category. The program also returns open purchase orders (trucks) that have not been received yet. At 706 the planner may perform a what-if analysis as noted above and at 708 the planner determines whether any truck or containers need to be ordered. If the answer is yes, the process proceeds to 710 to order the trucks/containers. The program automatically creates purchase orders to procure materials from the supplier. If there are no orders or the procuring of the purchase orders is complete, the process proceeds to 712 where the planner can run MRP for materials touched during the execution of the truck build/container maintenance transaction. If none have been touched the process is done. At 714 the program executes the MRP runs only for the materials touched during the truck build/container maintenance execution and then returns to 702 for further maintenance, if needed.

It is also contemplated that a layout of a load on a truck can be optimized with respect to unloading and/or with respect to the anticipated deployment of the load at the particular destination. For example, items for a particular load could be loaded on a truck in reverse chronological order based on their delivery date. In particular, suppose 50 units of A are due for delivery on day 1 and 25 units of B on day 2. When using the system, these requisitions may be combined to form a full truck for delivery on day 1. According to this optional layout, items B would be loaded first on the truck and items A loaded last. This would result in items A unloaded first on day 1 at the destination because items A would be immediately needed on day 1. Items B could be unloaded later on during day 1 or the unloading could be delayed for convenience until day 2.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of optimizing loads to be delivered on a particular date to a particular destination in response to a plurality of requisitions for various items to be delivered from various vendors to various destinations, said method comprising:

Determining a demand for one or more items that are needed at a particular destination during a time period;

Identifying requisitions of the one or more items to be delivered to the particular destination from a vendor on a particular date corresponding to the time period;

Consolidating, by a processor, the requisitions for the particular date to create one or more optimized loads and a partial load, said created loads being optimized for container capacity;

Determining a horizon date subsequent to the particular date;

Consolidating, by a processor, the partial load with at least one requisition for a date later than the particular date but not later than the horizon date to create an additional optimized load, thereby creating a delivery schedule of optimized loads for the particular date; and Displaying the delivery schedule of optimized loads on a display device, wherein an operator either confirms or edits the delivery schedule based on the displayed delivery schedule of optimized loads.

2. The method of claim 1 wherein said consolidating requisitions comprises consolidating item orders based on one or more of the following: a minimum incremental order quantity for each item, a minimum total order quantity for each item, an optimum total order quantity for each item, and a maximum total order quantity.

3. The method of claim 1 wherein, in response to a change in one of the identified requisitions relating to the one or more items to be delivered at a particular destination at the particular date, said method further comprises repeating, for requisitions affected by the change to the one of the identified requisitions, said consolidating the requisitions for the particular date and said consolidating the partial load with at least one requisition later than the particular date but not later than the horizon date.

4. The method of claim 1, further comprising modifying the optimized loads of the delivery schedule.

5. The method of claim 4, further comprising:
identifying requisitions affected by the modifying of the optimized loads; and
optimizing loads for the identified requisitions affected by the modifying of the optimized loads.

6. The method of claim 1, wherein determining the horizon date subsequent to the particular date comprises receiving a horizon date specified by an operator.

7. A method of optimizing loads to be delivered on a particular date to a particular destination from a plurality of requisitions for various items from various vendors for various destinations, said method comprising:
Determining a demand for one or more items that are needed at a particular destination during a time period;
Identifying requisitions of the one or more items to be delivered to the particular destination from a vendor on a particular date corresponding to the time period;
Consolidating, by a processor, the requisitions for the particular date to create one or more optimized loads and a partial load, said created loads being optimized for container capacity;
Determining a horizon date subsequent to the particular date;
Consolidating, by a processor, the partial load with at least one requisition subsequent to the particular date but not subsequent to the horizon date to create an additional optimized load, thereby creating a delivery schedule of optimized loads for the particular date; and
Displaying the delivery schedule of optimized loads on a display device, wherein an operator either confirms or edits the delivery schedule based on the displayed delivery schedule of optimized loads.

8. The method of claim 7 wherein said consolidating requisitions comprises consolidating item orders based on one or more of the following: a minimum incremental order quantity for each item, a minimum total order quantity for each item, an optimum total order quantity for each item, and a maximum total order quantity.

9. The method of claim 7 wherein displaying the delivery schedule of optimized loads on the display device comprises displaying the delivery schedule for review and modification by an individual.

10. The method of claim 7 wherein, in response to a change in a particular requisition relating to a particular item to be delivered at a particular destination at a particular date, said method further comprises repeating, for requisitions affected by the change to the particular requisition, said consolidating the requisitions for the particular date and said consolidating the partial load with at least one requisition subsequent to the particular date but not subsequent to the horizon date.

11. A method of consolidating a plurality of requisitions for various items from various vendors to be delivered to various destinations on or after a specified date to create one or more truckloads, each for delivery on the specified date or thereafter, said method comprising:
Identifying requisitions of items to be delivered on the specified date from a particular vendor to a particular destination;
Consolidating, by a processor, the requisitions to create one or more optimized loads and a partial load, said created loads being optimized for container capacity;
Determining a horizon date subsequent to the specified date;
Consolidating, by a processor, the partial load with at least part of one or more requisitions for delivery on a date subsequent to the specified date but not subsequent to the horizon date to create an additional optimized load;
Assigning the specified date as the delivery date for the additional optimized load, thereby creating a delivery schedule of optimized loads for the specified date; and
Displaying the delivery schedule of optimized loads on a display device, wherein an operator either confirms or edits the delivery schedule based on the displayed delivery schedule of optimized loads.

12. The method of claim 11 wherein said consolidating requisitions comprises consolidating item orders based on one or more of the following: a minimum incremental order quantity for each item, a minimum total order quantity for each item, an optimum total order quantity for each item, and a maximum total order quantity.

13. The method of claim 11 further comprising modifying the delivery schedule and implementing the modified delivery schedule.

14. The method of claim 11 wherein, in response to a change in a particular requisition relating to a particular item to be delivered at a particular destination at a particular date, said method further comprises repeating, for requisitions affected by the change to the particular requisition, said consolidating the requisitions for the particular date and said consolidating the partial load with at least part of one or more requisitions for delivery on a date subsequent to the particular date but not subsequent to the horizon date.

15. A computer readable medium including instructions for consolidating a plurality of requisitions for various items from various vendors to be delivered to various destinations on or after a specified date to create one or more truckloads, each for delivery on the specified date or thereafter, said instructions comprising instructions for:
Identifying requisitions of items to be delivered on the specified date from a particular vendor to a particular destination;
Consolidating the requisitions to create one or more optimized loads and a partial load, said created loads being optimized for container capacity;
Determining a horizon date subsequent to the specified date;

Consolidating the partial load with at least part of one or more requisitions for delivery on a date subsequent to the specified date but not subsequent to the horizon date to create an additional optimized load;

Assigning the specified date as the delivery date for the additional optimized load, thereby creating a delivery schedule of optimized loads for the specified date; and Displaying the delivery schedule of optimized loads on a display device.

16. The medium of claim 15 further including instructions for optimizing a layout of a load with respect to unloading and/or with respect to an anticipated deployment of the load at the particular destination.

* * * * *

UNITED STATES PATENT AND TRADEMARK OFFICE
CERTIFICATE OF CORRECTION

| | | |
|---|---|---|
| PATENT NO. | : 7,668,727 B2 | Page 1 of 1 |
| APPLICATION NO. | : 11/119296 | |
| DATED | : February 23, 2010 | |
| INVENTOR(S) | : Mitchell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Twenty-eighth Day of December, 2010

David J. Kappos
*Director of the United States Patent and Trademark Office*